Nov. 14, 1933.  W. A. COVENTRY  1,935,353

TOY

Filed June 4, 1930

INVENTOR
William A. Coventry
BY Norman N. Holland
ATTORNEY

Patented Nov. 14, 1933

1,935,353

UNITED STATES PATENT OFFICE 1,935,353

TOY

William A. Coventry, Lancaster, Pa., assignor to Grey Iron Casting Company, Mount Joy, Pa., a corporation of Pennsylvania Application June 4, 1930. Serial No. 459,189

7 Claims. (Cl. 35—12)

The present invention relates to toys and more particularly to toys and small objects which are both amusing and instructive, although many of its features may be utilized otherwise.

The invention, while perhaps more particularly interesting to children, may, and is intended to be utilized by grown persons. Children love animals and birds of all descriptions and are continually attempting to make or draw such objects. Parents ordinarily desire to give their children full appreciation of the animal world and, to this end, purchase picture books, crayons, water colors and the like, to encourage them in becoming absorbed in drawing and painting animals and other objects. Children, likewise, purchase picture books if they can obtain the necessary money. Such books are relatively expensive because of the character of the paper required and, when once used, are useless except as a keepsake. Where crayons or water colors are used, errors cannot be corrected; instead, a new page is started each time, hence a child may, in a few minutes, spoil an entire book.

The present invention aims to provide a less expensive and more amusing pastime and to eliminate the difficulties noted above. These advantages may be atttained by providing soldiers, buildings, trees, animals, birds, and other objects made from cast metal. The objects themselves appeal to the children; in addition, they are provided with a water-resisting coating, having a non-oleaginous surface so that they may be painted or colored to suit the children's taste. Such toy objects may be sold in boxes with corresponding objects lithographed or printed thereon; or additional objects may be provided with permanent coloring thereon to serve as a guide for painting the plain-colored objects. The coating or paint on the toys permits repeated washings without damage. Hence, if the children make an error or are not satisfied with their work, they may remove it and start over. The same object may be painted and repainted again and again. A particular decoration may be preserved by applying a coating of wax, shellac, or any substantially white varnish, over the water color. The wax coating is semi-permanent but can be readily washed off with warm water. A coating of any substantially white varnish makes the water color permanent without materially changing its shade. The invention is particularly adapted for teaching drawing and painting in schools and colleges where the instructors may either buy or prepare models as guides for the pupils.

Grown persons find it interesting and instructive to assist the children with their painting and to paint some of the objects as models. Other uses of the invention may be in connection with articles of household utility such as book ends, door stops, door knockers, decorative objects and the like. These are, of course, more particularly interesting to grown persons. The articles may be sold with the base coating and may, thereafter, be decorated with water colors to suit the individual's taste and made permanent by coating them with varnish.

An object of the present invention is to provide an inexpensive, educational device which will amuse and develop artistic talent in grown persons as well as children.

Another object of the invention is to provide toy objects such as buildings, fences, machinery, animals, birds and the like, permitting painting grouping and arrangement thereof as a pastime.

Another object of the invention is to eliminate the difficulties heretofore encountered in providing suitable models to be painted with water colors.

Another object of the invention is to provide toy objects such as Indians, soldiers, animals, birds and the like, having a permanent water resisting coating thereon adapted to permit repeated application and removal of water colors.

Another object of the invention is to provide toy subjects, such as animals, cages and wagons simulating circus equipment, and also soldiers, Indians, cowboys and the like, which may be water-colored, particularly for amusement of children.

Another object of the invention is to coat various objects such as book ends, door stops, door knockers, decorative objects and the like with a water resisting coating thereon adapted to permit application and removal of water colors.

Other and further objects and uses of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is an elevational view of an object in accordance with the present invention, here illustrated as a small animal;

Figure 1:
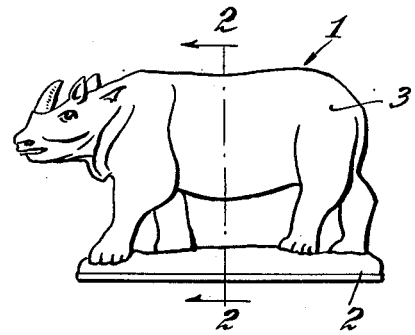
Figure 3:
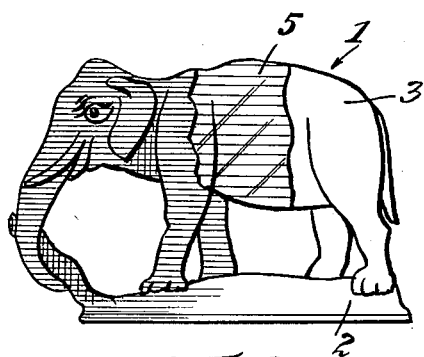
Fig. 3 is a fragmentary elevational view illustrating the base coating, the water coloring and the protecting coating over the water coloring.
Figure 2:
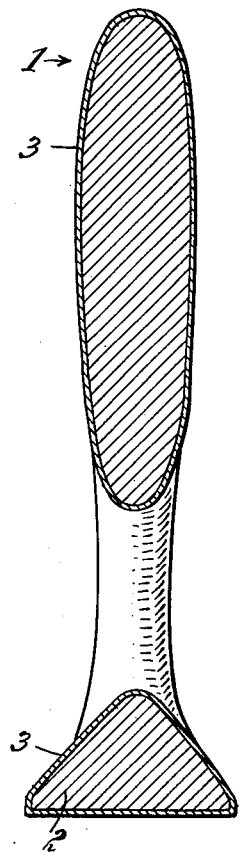
Fig. 2 is a sectional view, along the line 2—2 of Fig. 1, illustrating the coating thereon.

It will be understood that there is no limit to the various objects which may be simulated and utilized in accordance with the present invention. It is deemed sufficient herein to indicate a few examples in the description and to show one or two in the drawing; for this purpose a small animal 1, illustrated as a rhinoceros in Fig. 1 and an elephant in Fig. 3, has been chosen and is shown mounted upon a base 2. Preferably, the toy is formed by casting the entire animal and attached base from a suitable metal, such as cast iron. Such objects are inexpensive and indestructible. Preferably, a water resisting and water adherent coating 3 is applied to the casting in any suitable manner. For example, a lacquer with a pyroxylin base may be sprayed on the objects. Such a lacquer dries in a few minutes sufficiently to permit handling without affecting the coating, and does not require baking. It will be understood that other water resisting coatings having an affinity for water colors are also applicable. Such coatings should be capable of withstanding rough usage without scratching or chipping off and preferably the finished coating should be substantially free from oily characteristics so that the decorative coating will not flake or creep. If desired, the coated objects may be treated or rubbed lightly with pumice to remove any hard glaze which may form on the surface of the coating.

In order to facilitate coloring of the objects, colored pictures may be shown on the box containing the animals or other objects, or certain of the objects may be provided with permanent coatings. This may be done by having a coating of wax applied over an object which has been water colored, as illustrated at 5 in Fig. 3. The wax is, of course, heated until it is soft, and applied with a brush. Such a coating is semi-permanent and can be washed off with warm water. A more permanent coating may be had by utilizing a light colored shellac or varnish which provides a permanent coating without materially affecting the water colors thereunder. Objects with coatings made permanent, as noted above, or otherwise, may be included in the box as guides for the children; or the parents may decorate the objects with as much originality as they see fit and cover them with a coating of shellac as a permanent guide for their children. In this way, the toys become instructive to the parents as well as to the children. In addition, objects such as book ends and the like may be sold primarily for adults to decorate for household or other use. Other ways of obtaining a permanent or semi-permanent coating corresponding to the color of the animals may be utilized.

Figure 4:
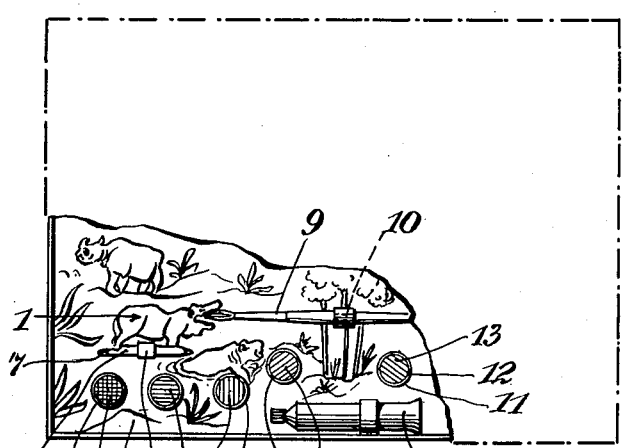
Fig. 4 is a plan view of a portion of a card or board for mounting a group of objects, here illustrated as animals, the water colors and brush.

While both the light colored and the permanently decorated objects may be sold individually, it is desirable to sell them in sets with a brush and suitable water colors. A preferred means of accomplishing this is shown in Fig. 4, where a large cardboard 6 is shown having apertures 7 therein in which the bases 2 of the toys are adapted to fit. A clip 8 may extend around the base and through the aperture, with its ends bent outwardly to hold the object in position on the board. A brush 9 may be similarly secured to the board through aperture 10. A series of round apertures 11 may also be provided in the board 6 to seat and retain suitable receptacles 12 illustrated as cups having water colors 13 therein.

As pointed out, one or more of the objects may be properly decorated with a permanent coloring as a guide for coloring other objects in the group. In addition, the mounting board 6 has lithographed or printed on it a series of pictures illustrating the appearance and color of various objects, particularly of the objects attached to the board. If desired, therefore, the pictures on the mounting board may serve as a guide to children painting the toy animals or other objects on the board.

It has been found that, in handling objects of this character, the oil from a person's skin collects on them and causes the water colors to run, which is undesirable. To avoid this, a suitable preparation is mixed with the colors or placed in a suitable container, such as the tube 14, for application to the brush and attached to the bottom of the board, as shown.

As noted above, the cast iron objects, preferably coated with a water resisting lacquer preferably having a pyroxylin base, are mounted on the cardboard upon which colored objects have been painted or lithographed as a guide for persons using the set. Suitable water colors may also be mounted on the board. The children or adults may apply the water colors to the animals, washing them as often as they choose, and repainting them. Where particularly good colors have been obtained, the child or adult may coat the colored object with wax or shellac so that it may be kept as a guide for future work, as an illustration of the person's aptitude, or as a permanently finished object or toy. While the description herein refers more particularly to painting and decorating objects, it will be understood that the invention has many other applications. For example, objects simulating tents, cages, animals and other equipment for a particular use, may be grouped together to allow both painting or grouping, or either of them, as a pastime. In this way, children may utilize the objects, whether decorated or not, to make toy circuses, farms, scenery and the like, thereby increasing the play aspects of the invention.

It will be seen that the present invention provides toys and other objects which are both amusing and instructive. Such objects are inexpensive and practically indestructible. They may be used over and over again without impairment thereof. Mistakes and errors in applying the colors may be quickly corrected without disturbing the portions already painted.

As various changes may be made in the form, construction and arrangement of the parts without departing from the spirit of the invention and without sacrificing its advantages, it is to be understood that all matter herein is to be interpreted as illustrative and not in a limiting sense.

Having thus described my invention, I claim:

1. As an article of manufacture, a toy having a water resisting coating thereon forming a non-oleaginous surface adapted for decoration with water colors, the surface of said water resisting coating being rough to increase its adaptability for retaining water colors.

2. As an article of manufacture, a cast metal object having a water resisting varnish coating thereon forming a surface for decoration with water colors, the surface of said varnish coating with a pyroxylin base being rough to increase its adaptability for retaining water colors and to prevent the water colors applied thereto from flaking off.

3. The method of making a toy object, which method comprises providing a toy object, coating said toy object with a water resisting coating which forms a substantially non-oleaginous surface adapted to receive and retain water colors, and roughening the surface of said coating to prevent flaking of the water colors from the object when applied thereto.

4. As an article of manufacture, a cast metal toy animal or similar object having a water resisting varnish coating thereon forming an undecorated surface adapted to receive and retain water colors for decorating with water colors, said water resisting coating being light in color to render it adaptable for decoration with water colors.

5. As an article of manufacture, a cast metal object having a light-colored water resisting coating thereon forming an undecorated substantially non-oleaginous water adherent surface for decorating with water colors, said light-colored water resisting coating being adapted to receive and retain water colors without showing through said water colors.

6. As an article of manufacture, a toy comprising a stiff sheet member having a colored picture thereon of a toy object to be copied, a toy object secured to said member simulating the physical shape of the pictured object with one side thereof exposed for painting without removal from said member, said toy object having an undecorated water resisting coating thereon providing a non-oleaginous surface adapted to receive and retain water colors.

7. As an article of manufacture, a toy comprising a relatively stiff sheet member having colored pictures thereon of objects to be copied, toy objects secured to said member simulating the physical shape of certain of said pictured objects, said toy objects having an undecorated water resisting coating thereon adapted to receive and retain water colors, and a holder secured to said member for retaining coloring means for said toy objects.

WILLIAM A. COVENTRY.